(12) United States Patent
Shaffer

(10) Patent No.: US 7,703,432 B2
(45) Date of Patent: Apr. 27, 2010

(54) BEARING SYSTEM HAVING A FLOATING BEARING MECHANISM

(75) Inventor: Bradley Joseph Shaffer, Romney, IN (US)

(73) Assignee: Caterpillar Inc., Peoria, IL (US)

( * ) Notice: Subject to any disclaimer, the term of this patent is extended or adjusted under 35 U.S.C. 154(b) by 94 days.

(21) Appl. No.: 11/984,394

(22) Filed: Nov. 16, 2007

(65) Prior Publication Data

US 2009/0129711 A1 May 21, 2009

(51) Int. Cl.
*F16C 9/00* (2006.01)
*F16C 35/00* (2006.01)

(52) U.S. Cl. .................... 123/197.4; 384/294; 384/430; 384/901

(58) Field of Classification Search ............... 123/197.3, 123/197.4; 74/579 R, 579 E; 384/294, 429, 384/430, 901
See application file for complete search history.

(56) References Cited

U.S. PATENT DOCUMENTS

| | | | |
|---|---|---|---|
| 1,413,317 A | 4/1922 | Bruce | |
| 1,498,170 A | 6/1924 | Jimerson | |
| 1,602,960 A | 10/1926 | Augustine | |
| 1,783,698 A | 12/1930 | Brownback | |
| 2,096,189 A | 10/1937 | Miller | |
| 2,225,876 A | 12/1940 | Mead et al. | |
| 2,342,036 A | 2/1944 | Chilton | |
| 2,532,795 A | 12/1950 | Underwood et al. | |
| 4,427,309 A | 1/1984 | Blake | |
| 4,512,290 A | 4/1985 | Ficht et al. | |
| 5,363,557 A | 11/1994 | Thompson et al. | |
| 5,537,971 A | 7/1996 | Pong | |
| 5,711,267 A | 1/1998 | Williams | |
| 5,885,006 A | 3/1999 | Sheedy | |
| 6,481,895 B2 | 11/2002 | Yang et al. | |
| 6,868,810 B2 | 3/2005 | Hojo et al. | |
| 7,194,995 B2 | 3/2007 | Virr | |
| 2004/0126042 A1* | 7/2004 | Schubert | 384/429 |
| 2005/0238269 A1 | 10/2005 | Endoh et al. | |

FOREIGN PATENT DOCUMENTS

DE 3024629 2/1982

(Continued)

OTHER PUBLICATIONS

Stachowiak et al., *Engineering Tribology*, 2nd ed., Butterworth-Heinemann, 2001., pp. 126, 128, and 192.

(Continued)

*Primary Examiner*—Noah Kamen
(74) *Attorney, Agent, or Firm*—Finnegan, Henderson, Farabow, Garrett & Dunner

(57) ABSTRACT

A bearing mechanism for mounting a connecting rod to a crankshaft is disclosed. The bearing mechanism may include a first bearing half-shell forming a first semicylindrical member and a second bearing half-shell forming a second semicylindrical member. The second bearing half-shell may be assembled to the first bearing half-shell to form a cylindrical member. The cylindrical member may include an outer surface, an inner surface, and at least one end.

20 Claims, 8 Drawing Sheets

FOREIGN PATENT DOCUMENTS

| | | |
|---|---|---|
| DE | 3537449 | 1/1987 |
| FR | 830306 | 12/1937 |
| FR | 1321969 | 3/1963 |
| FR | 2513335 A * | 3/1983 |
| GB | 1174660 | 12/1969 |
| JP | 07-127632 | 5/1995 |
| WO | 2008/059371 | 5/2008 |

OTHER PUBLICATIONS

STI Sales Technology Inc. [online]. Journal Bearings [online], 3 pages, [retrieved on Nov. 15, 2007 ]. Retrieved from the Internet: URL: http://www.stiweb.com/appnotes/jb.htm.

Rotech Engineering Services [online]. Fixed-Geometry Radial Journal Bearings [online], 6 pages, [retrieved on Nov. 15, 2007]. Retrieved from the Internet: URL: http://www.rotechconsulting.com/bearings_sub1.htm.

Diagram of bearing, 1 page, Source unknown, Date unknown.

* cited by examiner

BEARING SYSTEM HAVING A FLOATING BEARING MECHANISM

TECHNICAL FIELD

The present disclosure is directed to a bearing system and, more particularly, a bearing system having a floating bearing mechanism.

BACKGROUND

Construction and earthmoving equipment, as well as many other types of machines, are commonly used in a wide variety of applications. Generally, a machine is powered by an internal combustion engine such as a diesel engine, a gasoline engine, a gaseous fuel-powered engine, or any other type of engine. These engines include a piston moving in a cylinder with accompanying combustion, the piston being retained in a cylinder block. A connecting rod connects the piston to a crankshaft, where a first end portion of the connecting rod is assembled to the piston and a second end portion of the connecting rod is assembled to a crankpin associated with the crankshaft. As an engine increases its speed, the crankshaft rotates at an increased speed, and the rotational movement of the crankshaft is converted to linear movement of the piston through the connecting rod. An oil film associated with the crankpin and an inner diameter surface of the second end portion experiences shearing as the crankpin rotates within the second end portion.

When an engine operates at high speeds, the shearing velocity of the oil film increases and may become excessive. The excessive shearing velocity of the oil film may result in less than desirable engine durability. As shearing velocity becomes excessive, the oil film becomes hotter which may cause the oil film viscosity to reduce and subsequently the oil film to become thinner. This may lead to contact between the inner diameter surface of the second end portion and the crankpin and increased wear of the second end portion.

One system for improving engine performance and durability is described in U.S. Patent Application Publication No. 2005/0238269 (the '269 publication) to Endoh et al., published on Oct. 27, 2005. The '269 publication describes a floating bearing formed as a single piece and disposed between a crankpin of a crankshaft and a big end of a connecting rod, with oil films formed on a side of the crankpin and on a side of the big end. The floating bearing acts in such a manner as to reduce friction loss of the crankshaft and wearing of the crankpin and the big end of the connecting rod. Specifically, during rotation of the crankpin relative to the big end, the floating bearing rotates at a velocity which is approximately one-half of the rotational velocity of the crankpin, such that friction between the floating bearing and the big end, and between the floating bearing and the crankpin, is smaller as compared to a crankpin rotating relative to just the big end of the connecting rod. Therefore, when the floating bearing is applied to an engine, the engine has increased durability and can operate at a high speed.

Although the floating bearing system of the '269 publication may reduce friction loss of the crankshaft and wear of the crankpin and the big end of the connecting rod, it may have limitations. The floating bearing is described as simply cylindrical in nature, and therefore, not likely to attain an efficient rate of relative rotation.

The bearing system of the present disclosure is directed towards improvements in the existing technology.

SUMMARY OF THE DISCLOSURE

One aspect of the present disclosure is directed to a bearing mechanism for mounting a connecting rod to a crankshaft. The bearing mechanism may include a first bearing half-shell forming a first semicylindrical member and a second bearing half-shell forming a second semicylindrical member. The second bearing half-shell may be assembled to the first bearing half-shell to form a cylindrical member. The cylindrical member may include an outer surface, an inner surface, and at least one end.

Another aspect of the present disclosure is directed to a bearing system. The bearing system may include a connecting rod, a crankshaft, a bearing mechanism, a first oil film, and a second oil film. The connecting rod may include an end portion, and the end portion may include an outer circumference. The crankshaft may include at least one side cheek and a crankpin disposed within the end portion. The bearing mechanism may be disposed between the end portion and the crankpin and may include a first bearing half-shell forming a first semicylindrical member and a second bearing half-shell forming a second semicylindrical member. The second bearing half-shell may be assembled to the first bearing half-shell to form a cylindrical member. The cylindrical member may include an outer surface, an inner surface, and at least one end. The first oil film may be associated with the end portion and the outer surface of the cylindrical member, and the second oil film may be associated with the inner surface of the cylindrical member and the crankpin.

DETAILED DESCRIPTION

Figure 1:
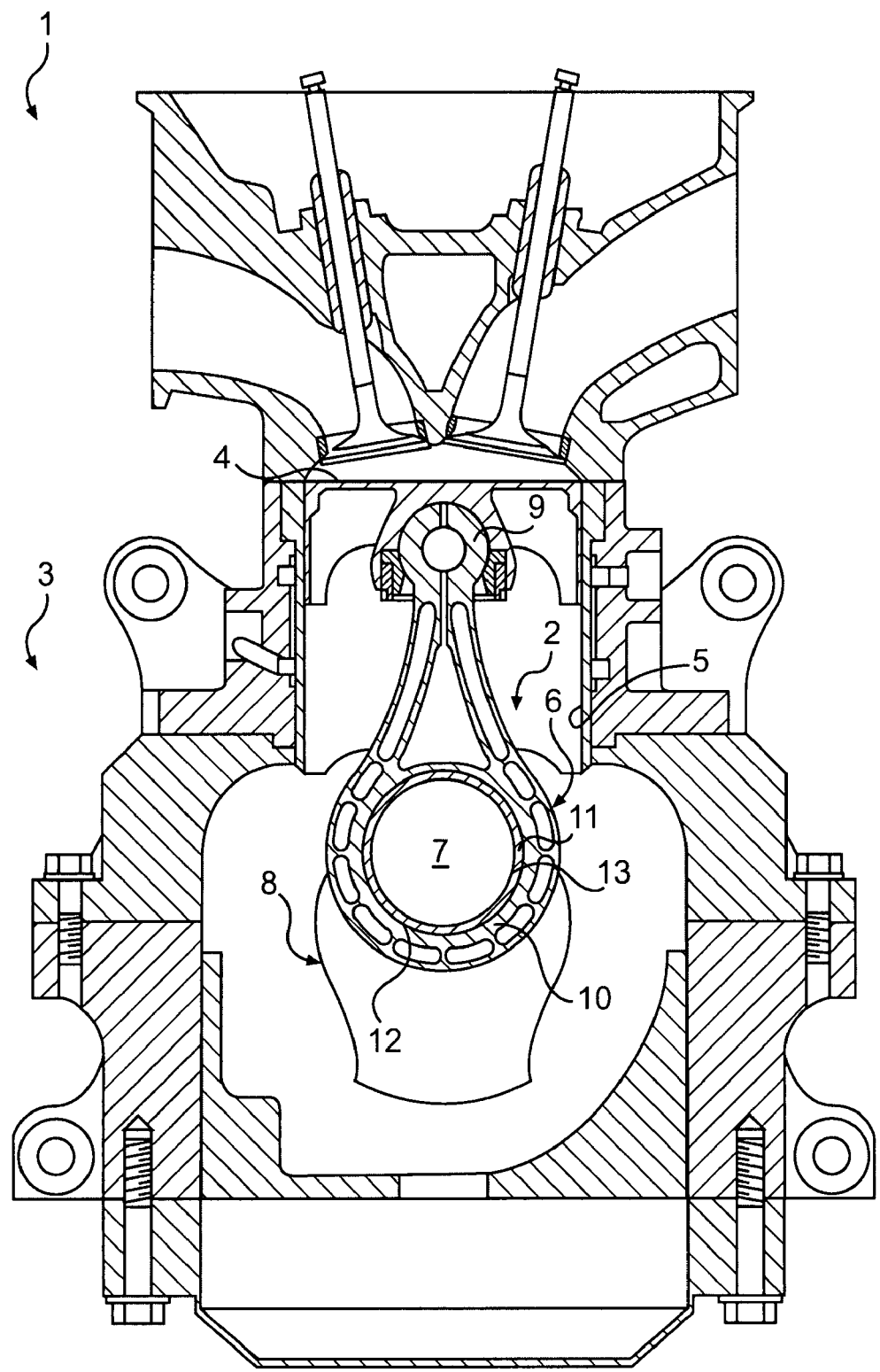
FIG. 1 is a diagrammatic view of an engine provided with a bearing system according to an exemplary disclosed embodiment.

FIG. 1 illustrates an exemplary internal combustion engine 1 employing a bearing system 2 of the present disclosure. Internal combustion engine 1 is depicted and described as a diesel engine. However, it is contemplated that internal combustion engine 1 may be any other type of internal combustion engine, such as, for example, a gasoline or natural gas engine. Internal combustion engine 1 may include a cylinder block 3 and a plurality of pistons 4 (only one shown) movably assembled within a plurality of cylinder bores 5 (only one shown) of the cylinder block 3. Piston 4 may be pivotally connected to a connecting rod 6, which in turn is pivotally connected to a crankpin 7 of a crankshaft 8. Connecting rod 6 includes a first end portion 9, e.g., a small end portion, connected to piston 4 and a second end portion 10, e.g., a big end portion, connected to crankpin 7 through a bearing mechanism 11. Bearing mechanism 11 may be disposed in a floating state between second end portion 10, in particular, an inner diameter surface of the second end portion 10, and crankpin 7 and surrounded by a first oil film 12 associated with second end portion 10 and bearing mechanism 11 and a second oil film 13 associated with bearing mechanism 11 and crankpin 7. Crankshaft 8 of internal combustion engine 1 may be rotatably disposed within cylinder block 3 and each piston 4 coupled to crankshaft 8 so that a sliding motion of each piston 4 within each cylinder bore 5 corresponds to rotation of crankshaft 8, enabling crankshaft 8 to drive devices (not shown) associated with engine 1, such as wheels of a machine. During rotation of crankpin 7 relative to second end portion 10, bearing mechanism 1 may rotate at a velocity substantially slower than the rotational velocity of crankpin 7.

As shown in FIG. 2, FIG. 3, FIG. 4, and FIG. 5, bearing system 2 may include the bearing mechanism 11 disposed between second end portion 10, in particular, the inner diameter surface of the second end portion, of connecting rod 6 and crankpin 7. Bearing mechanism 11 may include a cylindrical member 14 having an outer surface 15, an inner surface 16, and at least one end 17. First oil film 12 may be associated with second end portion 10 and outer surface 15 of cylindrical member 14. Second oil film 13 may be associated with inner surface 16 of cylindrical member 14 and crankpin 7, and inner surface 16 and crankpin 7 may be in shear communication with second oil film 13. A bearing 18 may be pressed onto second end portion 10 and include a third surface 19. An overlay material 20, such as lead or tin, for example, may be assembled on third surface 19 or second end portion 10 and configured to be softer than cylindrical member 14 and connecting rod 6 so that it may embed debris and protect connecting rod 6 and crankpin 7 from damage. Outer surface 15 and overlay material 20 of third surface 19 or second end portion 10 may be in shear communication with first oil film 12.

Figure 2:
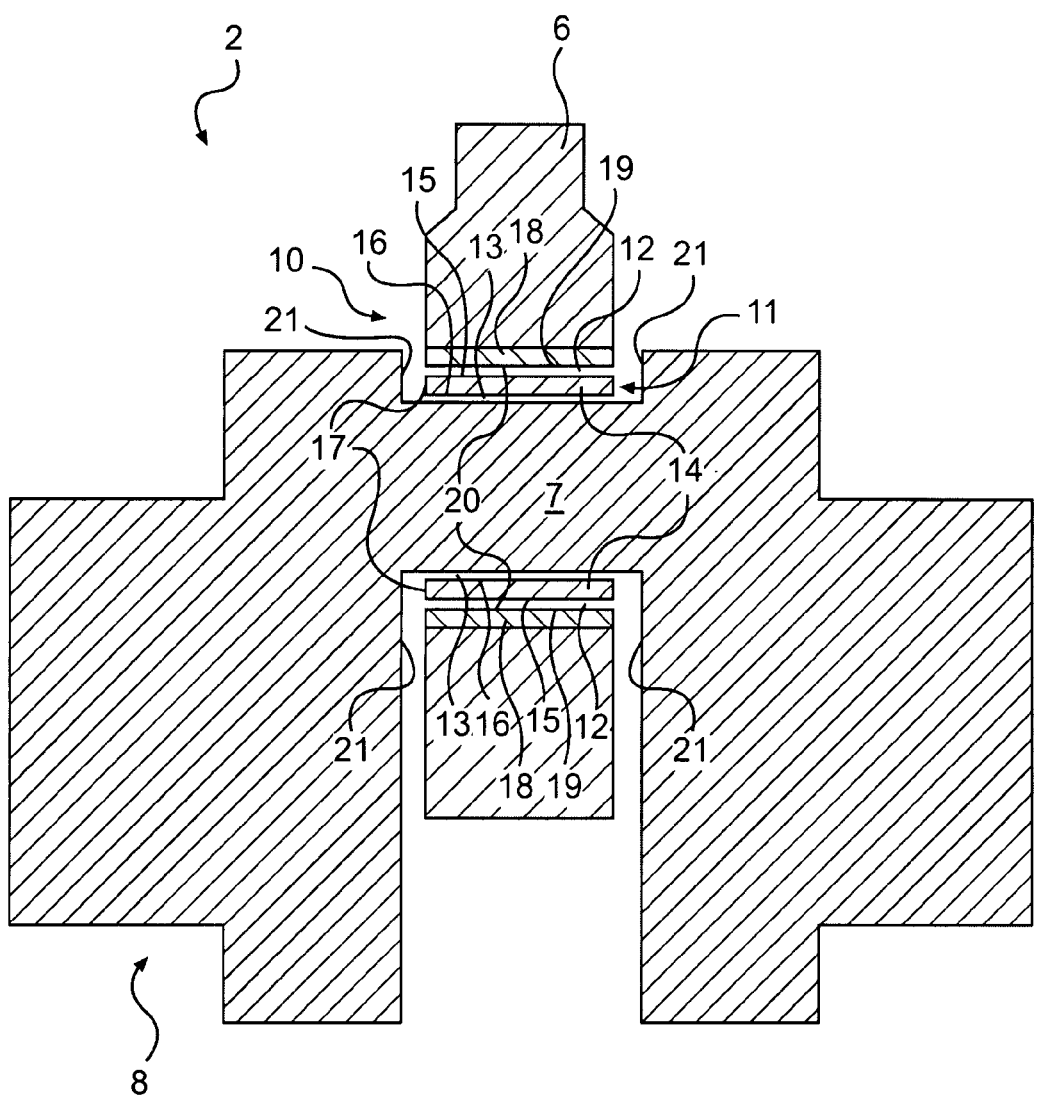
FIG. 2 is a diagrammatic cross-section of a bearing system for an engine according to an exemplary disclosed embodiment.

In one embodiment of bearing system 2 shown in FIG. 2, end 17 of cylindrical member 14 may be in communication with at least one side cheek 21 of crankshaft 8. In another embodiment of bearing system 2 shown in FIG. 3, second end portion 10 of connecting rod 6 may include one or more annular protrusions 22 extending radially from at least an outer circumference 23 of second end portion 10. At least one end 17 of cylindrical member 14 may be in communication with at least one annular protrusion 22 of second end portion 10. In other embodiments of bearing system 2 shown in FIG. 4 and FIG. 5, second end portion 10 of connecting rod 6 may include an annular protrusion 22 extending radially from one side of outer circumference 23 of second end portion 10. One end 17 of cylindrical member 14 may be in communication with a side cheek 21 of crankshaft 8, and the other end 17 of cylindrical member 14 may be in communication with annular protrusion 22 of second end portion 10.

Figure 4:
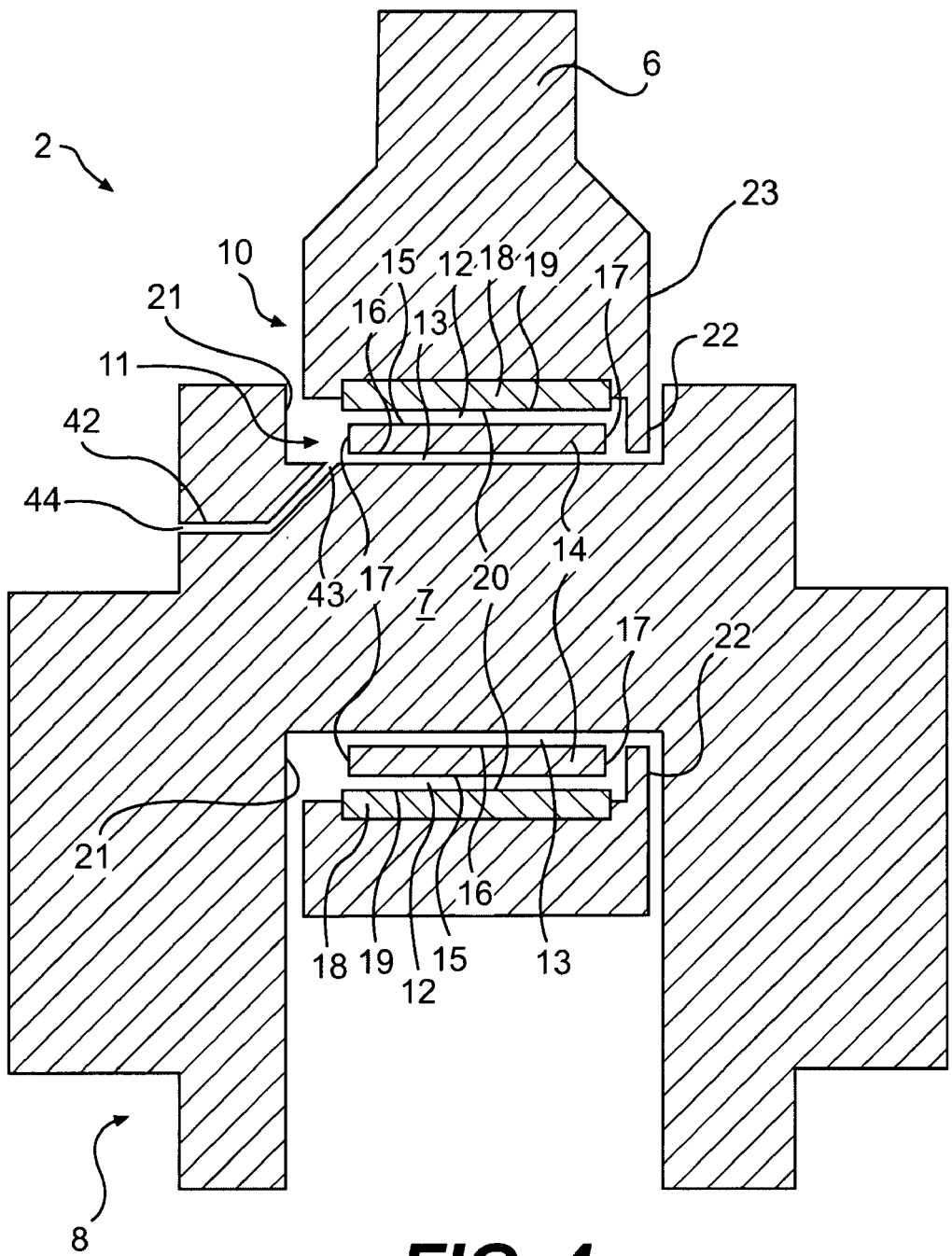
FIG. 4 is a diagrammatic cross-section of another embodiment of a bearing system for an engine according to an exemplary disclosed embodiment.
Figure 5:
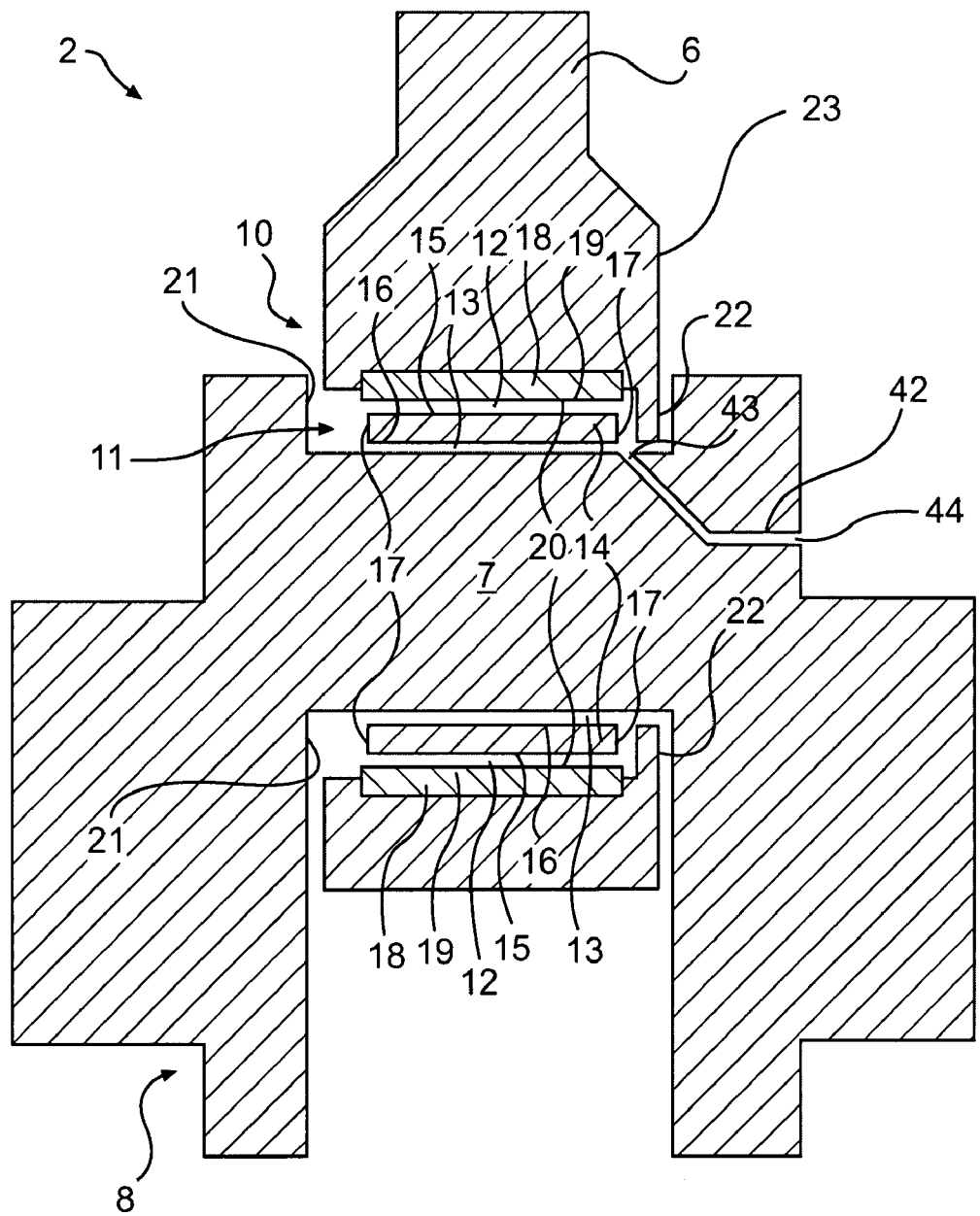
FIG. 5 is a diagrammatic cross-section of another embodiment of a bearing system for an engine according to an exemplary disclosed embodiment.

As shown in FIG. 4 and FIG. 5, bearing system 2 may include at least one channel 42 associated with crankshaft 8 configured to provide a passageway for pressurized oil or any other fluid lubrication media from engine 1 through cylinder block 3 and to crankshaft 8. In FIG. 4, channel 42 may include a first opening 43 positioned lateral to an end 17 of cylindrical member 14 and between a side cheek 21 of crankshaft 8 and end 17. A second opening 44 may be located on crankshaft 8. In FIG. 5, channel 42 may include a first opening 43 positioned lateral to an end 17 of cylindrical member 14 and between an annular protrusion 22 of second end portion 10 and end 17. Similarly, a second opening 44 may be positioned on crankshaft 8.

Figure 6:
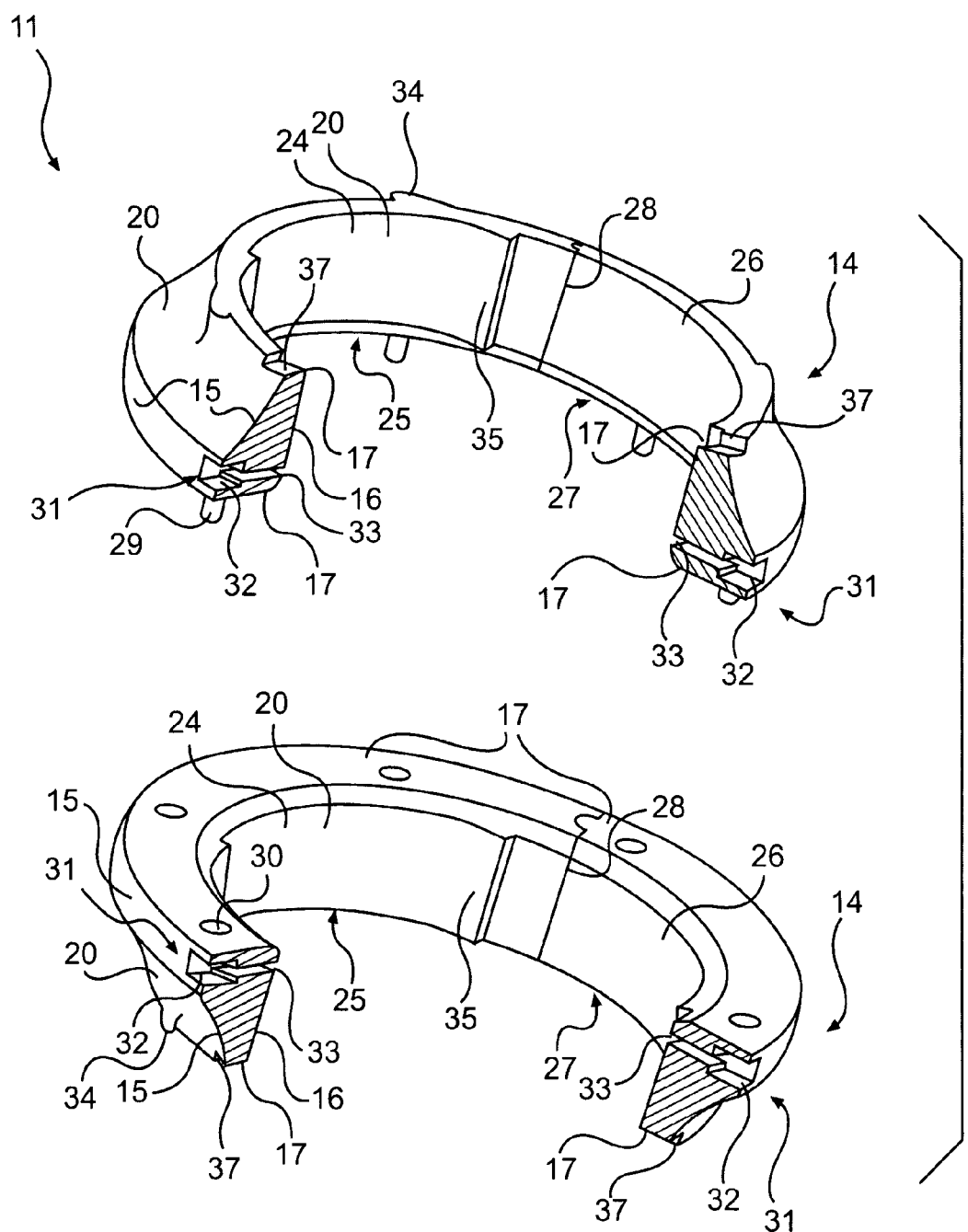
FIG. 6 is a diagrammatic cross-section of a bearing mechanism according to an exemplary disclosed embodiment and employed in the bearing system of FIG. 2, FIG. 3, FIG. 4, and FIG. 5.

An exemplary embodiment of a bearing mechanism 11, that may be employed in the embodiments of bearing system 2 described in FIG. 2, FIG. 3, FIG. 4 and FIG. 5, is shown in FIG. 6. Bearing mechanism 11 may include a first bearing half-shell 24 forming a first semicylindrical member 25 and a second bearing half-shell 26 forming a second semicylindrical member 27. First bearing half-shell 24 and second bearing half-shell 26 may be fastened together to form cylindrical member 14, where cylindrical member 14 may include an outer surface 15, an inner surface 16, and at least one end 17. In this embodiment, first bearing half-shell 24 and second bearing half-shell 26 may be fastened together by a snap fit 28, but it will be understood that first bearing half-shell 24 and second bearing half-shell 26 may be fastened together by alternative methods, such as, a bolted arrangement, a tab and screw arrangement, welding, soldering, serrated or fracture split surfaces, or epoxy. At least one additional cylindrical member 14 may be axially assembled to bearing mechanism 11. Dowel 29 may be assembled to at least one end 17 of cylindrical member 14 and may be configured to engage hole 30 of at least one additional cylindrical member 14. It will be understood that at least one additional cylindrical member 14 may be assembled to bearing mechanism 11 by a variety of alternative methods, such as a dovetail joint or a lap joint, and is not limited to the dowel 29 and hole 30 arrangement.

An overlay material 20, such as lead or tin, for example, may be assembled on outer surface 15 and inner surface 16 of cylindrical member 14 and configured to be softer than cylindrical member 14 and connecting rod 6. One or more apertures 31 may be provided through outer surface 15 and inner surface 16 of cylindrical member 14. Aperture 31 may include a first width 32 associated with outer surface 15 and a second width 33 associated with inner surface 16, where first width 32 and second width 33 are configured to be unequal in size, permitting the area of outer surface 15 participating in shearing of oil to be substantially equal to the area of inner surface 16 participating in shearing of oil. At least a first hydrodynamic ramp 34 may be coupled to outer surface 15 of cylindrical member 14 and at least a second hydrodynamic ramp 35 may be coupled to inner surface 16 of cylindrical member 14. While first hydrodynamic ramp 34 may be coupled to outer surface 15 and second hydrodynamic ramp 35 may be coupled to inner surface 16, it will be understood that outer surface 15 and inner surface 16 may employ other protuberances or voids, such as, Raleigh steps, tilted pads, taper lands, or parabolic wedges.

In some embodiments, outer surface 15 of cylindrical member 14 may be substantially tapered at an end 17 so as to minimize shear, torque and rotating effort on bearing mechanism 11. While at least one end 17 of cylindrical member 14 may be substantially tapered, it will be understood that end 17 may employ other shapes, protuberances, or voids to minimize or maximize shear, torque, and rotating effort on bearing mechanism 11.

End 17 of cylindrical member 14 may include a hydraulic turbine blade feature, such as, first cut-out groove 37, disposed from outer surface 15 and to inner surface 16 of cylindrical member 14. First cut-out groove 37 is further described below and shown in FIG. 7 and FIG. 8.

Figure 7:
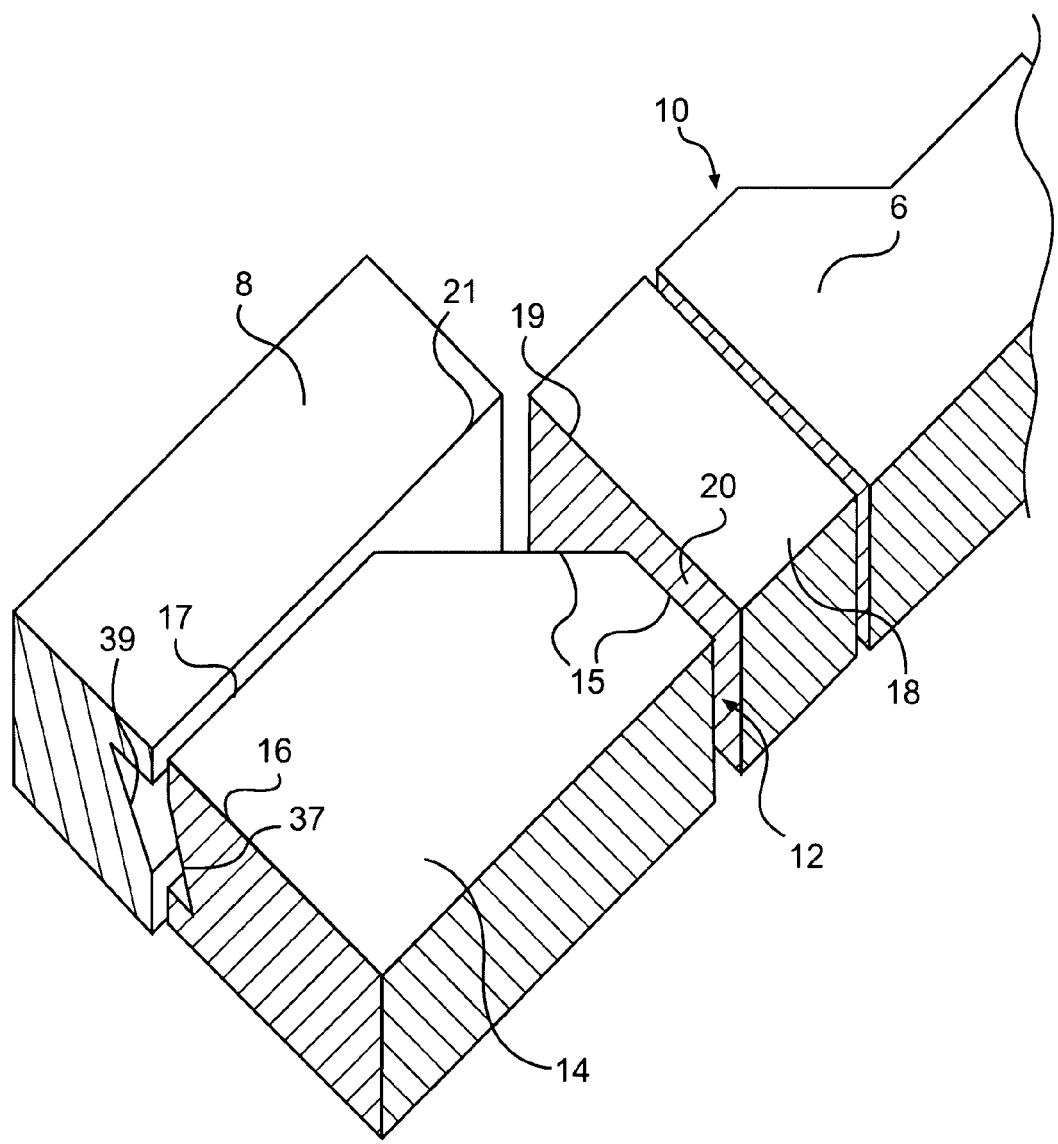
FIG. 7 is a schematic illustration of a portion of the bearing system of FIG. 2, FIG. 4, and FIG. 5 according to an exemplary disclosed embodiment.

FIG. 7 diagrammatically illustrates a portion of FIG. 2, FIG. 4, and FIG. 5. In particularly, end 17 of cylindrical member 14 is shown in communication with side cheek 21 of crankshaft 8. End 17 may include first cut-out groove 37 disposed from outer surface 15 and to inner surface 16 of cylindrical member 14 as discussed in connection with FIG. 6. Side cheek 21 may also include a hydraulic turbine blade feature, such as, second cut-out groove 39, disposed on side cheek 21 and facing end 17 of cylindrical member 14.

Figure 3:
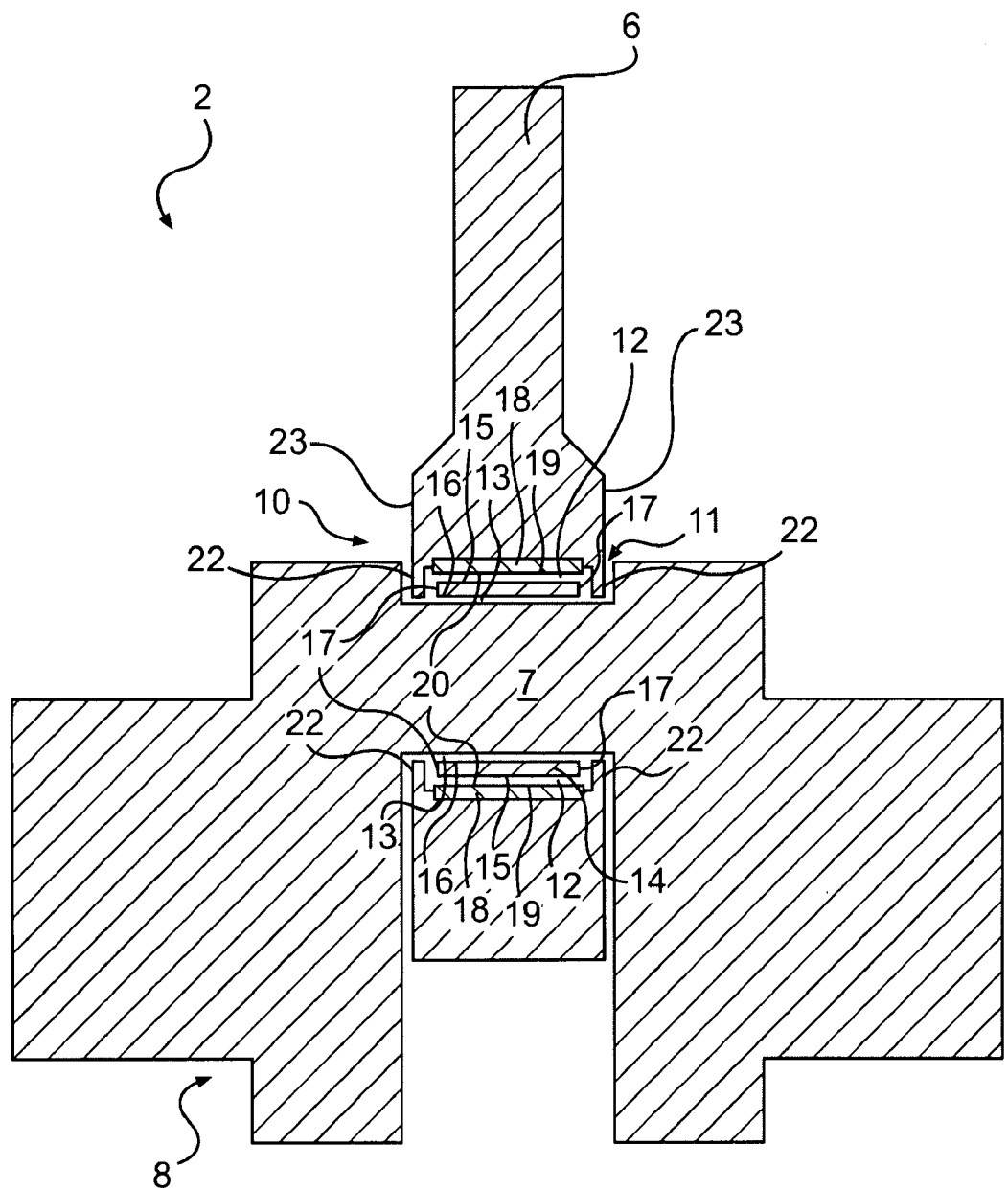
FIG. 3 is a diagrammatic cross-section of another embodiment of a bearing system for an engine according to an exemplary disclosed embodiment.
Figure 8:
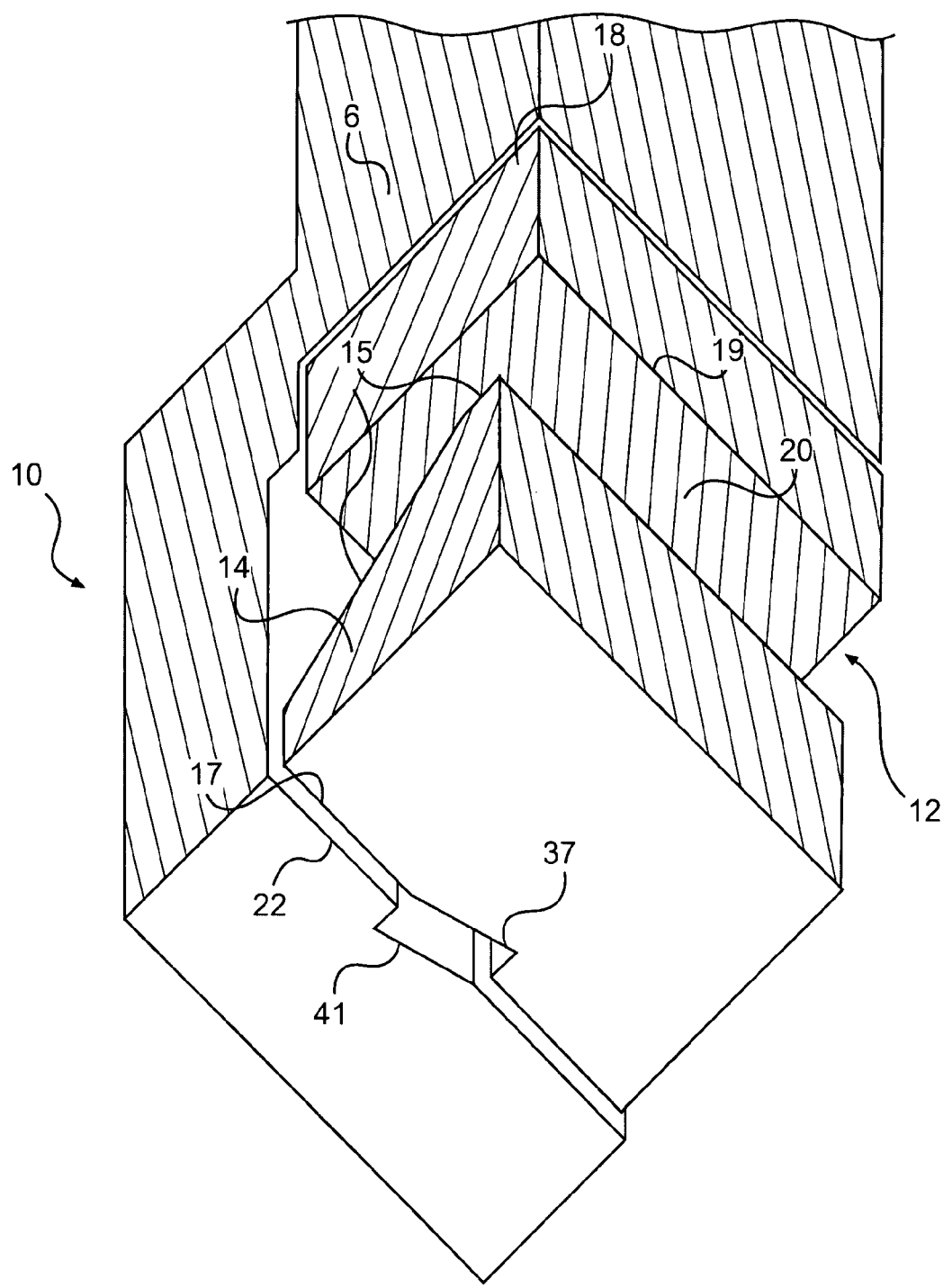
FIG. 8 is a schematic illustration of a portion of the bearing system of FIG. 3, FIG. 4 and FIG. 5 according to an exemplary disclosed embodiment.

FIG. 8 illustrates a portion of FIG. 3, FIG. 4, and FIG. 5. In particularly, end 17 of cylindrical member 14 is shown in communication with annular protrusion 22 of second end portion 10. End 17 may include first cut-out groove 37 disposed from outer surface 15 and to inner surface 16 of cylindrical member 14 as discussed in connection with FIG. 6. Annular protrusion 22 may also include a hydraulic turbine blade feature, such as, third cut-out groove 41, disposed on annular protrusion 22 and facing end 17 of cylindrical member 14.

It will be understood that first cut-out groove, second cut-out groove, and third cut-out groove may employ other protuberances or voids to induce a rotating effort on bearing mechanism 11.

INDUSTRIAL APPLICABILITY

The disclosed bearing system 2 may have applicability with internal combustion engines. As shown in FIG. 1, bearing system 2 may be employed to facilitate conversion of linear movement of piston 4 to rotational movement of crankshaft 8 through connecting rod 6. Bearing mechanism 11 may be disposed in a floating state between crankpin 7 of crankshaft 8 and second end portion 10 of connecting rod 6, where first oil film 12 may be disposed between second end portion 10 and bearing mechanism 11 and second oil film 13 may be disposed between bearing mechanism 11 and crankpin 7. As engine 1 operates at higher speeds, crankshaft 8 may rotate at an increased speed. During rotation of crankshaft 8, crankpin 7 of crankshaft 8 may rotate relative to second end portion 10 of connecting rod 6, and bearing mechanism 11 may rotate at a velocity substantially less than the rotational velocity of crankpin 7 as first oil film 12 and second oil film 13 experience shearing. Because bearing mechanism 11 may rotate at a velocity substantially less than the rotational velocity of crankpin 7, engine 1 performance and durability may be improved. Shearing velocity of first oil film 12 may be more manageable, preventing thinning and over heating of first oil film and eventual wear and failure of second end portion 10. Also, a more manageable shearing velocity of first oil film 12 and second oil film 13 may permit a higher rotational velocity of crankshaft 8 as engine 1 speed increases.

As shown in FIG. 6, bearing mechanism 11 may include cylindrical member 14. Cylindrical member 14 may include first bearing half-shell 24 and second bearing half-shell 26 fastened together by a snap fit 28 or any of various other arrangements. Additional cylindrical member 14 may be axially assembled to bearing mechanism 11. Dowel 29 may be assembled to an end 17 of cylindrical member 14 and may be configured to engage hole 30 of an additional cylindrical member 14. Therefore, bearing mechanism 11 may be easily assembled as a substantially symmetrical single piece with increased stiffness and rigidity.

Aperture 31 may be provided through outer surface 15 and inner surface 16 of cylindrical member 14. Aperture 31 may include a first width 32 associated with outer surface 15 and a second width 33 associated with inner surface 16, where first width 32 and second width 33 are configured to be unequal in size, permitting the area of outer surface 15 participating in shearing of first oil film 12 with second end portion 10 to be substantially equal to the area of inner surface 16 participating in shearing of second oil film 13 with crankpin 7. Shear velocity of first oil film 12 and second oil film 13 may be substantially equal as well, enhancing relative rotational velocity of bearing mechanism 11.

Overlay material 20, such as lead or tin, for example, may be assembled on outer surface 15 and inner surface 16 of cylindrical member 14 and configured to be softer than cylindrical member 14. The soft overlay material 20 may be configured to provide protection for second end portion 10 and crankpin 7 by embedding debris and permitting limited operation of connecting rod 6 without the presence of oil. As shown in FIG. 2, FIG. 3, FIG. 4, FIG. 5, FIG. 7 and FIG. 8, bearing 18 may be pressed onto second end portion 10 of connecting rod 6 and may include a third surface 19. Overlay material 20 may also be assembled on third surface 19 and configured to be softer than cylindrical member 14 so that it may embed debris and provide another layer of protection for connecting rod 6 and crankpin 7 against wear and failure.

A first hydrodynamic ramp 34 may be coupled to outer surface 15 of cylindrical member 14 and a second hydrodynamic ramp 35 may be coupled to inner surface 16 of cylindrical member 14. First hydrodynamic ramp 34 and second hydrodynamic ramp 35 may be configured to enhance first oil film 12 and second oil film 13 thickness, pressure, load carrying ability and oil lubrication of outer surface 15 and inner surface 16 of cylindrical member 14. Enhanced first oil film 12 and second oil film 13 thicknesses and lubrication may prevent direct contact of second end portion 10 and crankpin 7 at high shear velocities and protect second end portion 10 and crankpin 7 from excessive wear and failure.

End 17 of cylindrical member 14 may employ a variety of shapes to minimize or maximize shear, torque and rotating effort on bearing mechanism 11. For example, as shown in FIG. 6, end 17 may be substantially tapered to minimize shear, torque and rotating effort on bearing mechanism 11. By configuring the shape of at least one end 17 of cylindrical member 14, relative rotational velocity of bearing mechanism 11 may be enhanced or preselected.

As shown in FIG. 7 end 17 of cylindrical member 14 may be in communication with a side cheek 21 of crankshaft 8, and as shown in FIG. 8, end 17 of cylindrical member 14 may be in communication with an annular protrusion 22 of second end portion 10. A first cut-out groove 37 of end 17, also shown in FIG. 6, may be in hydraulic communication with either a second cut-out groove 39 of side cheek 21, shown in FIG. 7, or a third cut-out groove 41 of annular protrusion 22 shown in FIG. 8. A hydraulic torque associated with the communication of first cut-out groove 37 and either second cut-out groove 39 or third cut-out groove 41 may rotate bearing mechanism 11. Hydraulic communication between a first cut-out groove 37 and either second cut-out groove 39 or third cut-out groove 41 may be less variable than shear communication between end 17 and either side cheek 21 or annular protrusion 22. Shearing may vary with running speed of crankshaft 8, thickness of oil, oil quality, oil temperature, and other factors, while hydraulic torque may be mainly controlled and varied by fluid mass transfer.

In FIG. 4 and FIG. 5, bearing system 2 may include end 17 of cylindrical member 14 in hydraulic communication with a side cheek 21 of crankshaft 8 and an annular protrusion 22 of second end portion 10 and may employ at least a first cut-out groove 37, a second cut-out groove 39, and a third cut-out groove 41, as shown in FIG. 7 and FIG. 8. Channel 42 may be associated with crankshaft 8 and provide a passageway for oil or any other fluid lubrication media employed in bearing system 2. As shown in FIG. 4, channel 42 may hydraulically thrust bearing mechanism 11 in an axial direction by controlling the supply pressure of oil or any other fluid lubrication media employed in bearing system 2. This may control relative rotational velocity of bearing mechanism 11 as the hydraulic thrust from channel 42 pushes end 17 of cylindrical member 14 closer to an annular protrusion 22 of second end portion 10, increasing fluid mass transfer from third cut-out groove 41 of annular protrusion 22 to first cut-out groove 37 of cylindrical member 14 to reduce relative rotational velocity of bearing mechanism 11. As shown in FIG. 5, channel 42 may hydraulically thrust bearing mechanism 11 in an axial direction by controlling the supply pressure of oil or any other fluid lubrication media employed in bearing system 2. This may control relative rotational velocity of bearing mechanism 11 as the hydraulic thrust from channel 42 pushes end 17 of cylindrical member 14 closer to side cheek 21 of crankshaft 8, increasing fluid mass transfer from second cut-out groove 39 of side cheek 21 to first cut-out groove 37 of cylindrical member 14 to increase relative rotational velocity of bearing mechanism 11.

Employing an aperture 31 and configuring the shape of an end 17 of cylindrical member 14 may enhance the relative rotational velocity of bearing mechanism 11. Because aperture 31 may include unequal first width 32 and second width 33, shear velocity of first oil film 12 and second oil film 13 may be substantially equal, thereby maintaining a desired relative rotational velocity of bearing mechanism 11. Configuring the shape of end 17 may maximize or minimize the shear, torque, and rotation of bearing mechanism 11. Hydraulic communication between at least a first cut-out groove 37, a second cut-out groove 39, and a third cut-out groove 41 may be less variable than shear communication, thereby enhancing and improving relative rotational velocity of bearing mechanism 11. Channel 42 may be assembled to crankshaft 8 to control and manage relative rotational velocity of bearing mechanism 11. Channel 42 may hydraulically thrust bearing mechanism 11 in an axial direction and increase or decrease rotation of bearing mechanism 11.

It will be apparent to those skilled in the art that various modifications and variations can be made to the bearing system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A bearing system, comprising:
   a connecting rod including an end portion, the end portion including an outer circumference;
   a crankshaft including at least one side cheek and a crankpin disposed within the end portion;
   a bearing mechanism disposed between the end portion and the crankpin, the bearing mechanism including a first bearing half-shell forming a first semicylindrical member and a second bearing half-shell forming a second semicylindrical member, the second bearing half-shell fastened to the first bearing half-shell to form a cylindrical member, the cylindrical member including:
   an outer surface;
   an inner surface; and
   at least one end;
   a first oil film associated with the end portion and the outer surface of the cylindrical member;
   a second oil film associated with the inner surface of the cylindrical member and the crankpin; and
   a bearing pressed onto the end portion, the bearing having a third surface.

2. The bearing system of claim 1, further including an overlay material assembled on the outer surface of the cylindrical member and the inner surface of the cylindrical member and at least one of:
   the third surface of the bearing; and
   the end portion;
   wherein the overlay material is configured to be softer than the cylindrical member and the connecting rod.

3. The bearing system of claim 2, wherein the end portion of the connecting rod includes an annular protrusion extending radially from the outer circumference of the end portion.

4. The bearing system of claim 3, wherein the at least one end of the cylindrical member is in communication with one of:
   the at least one side cheek; and
   the annular protrusion.

5. The bearing system of claim 4, further including at least one channel associated with the crankshaft, the at least one channel including a first opening positioned lateral to the at least one end of the cylindrical member, and a second opening positioned on the crankshaft.

6. The bearing system of claim 4, wherein the at least one end of the cylindrical member includes a first cut-out groove disposed from the outer surface and to the inner surface of the cylindrical member.

7. The bearing system of claim 6, wherein the at least one side cheek includes a second cut-out groove disposed on the at least one side cheek and facing the at least one end of the cylindrical member.

8. The bearing system of claim 7, wherein the annular protrusion includes a third cut-out groove disposed on the annular protrusion and facing the at least one end of the cylindrical member.

9. The bearing system of claim 2, further including at least one aperture through the outer surface and the inner surface of the cylindrical member, the at least one aperture including a first width associated with the outer surface and the first oil film and a second width associated with the inner surface and the second oil film, and wherein the first width and the second width are unequal in size.

10. The bearing system of claim 2, wherein the outer surface of the cylindrical member is substantially tapered at the at least one end.

11. The bearing system of claim 2, further including at least a first hydrodynamic ramp coupled to the outer surface of the cylindrical member and at least a second hydrodynamic ramp coupled to the inner surface of the cylindrical member.

12. An engine assembly, comprising:
   a cylinder block including a cylinder bore;
   a piston movably assembled within the cylinder bore; and
   a bearing system associated with the cylinder block, the bearing system including:
   a crankshaft operatively assembled to a lower portion of the cylinder block, the crankshaft including:
   a crankpin; and
   at least one side cheek;
   a connecting rod assembly including a first end portion pivotally connected to the piston and a second end portion pivotally connected to the crankpin of the crankshaft, the second end portion including an outer circumference; and a bearing mechanism disposed between the second end portion and the crankpin, the bearing mechanism including:
  a first bearing half-shell forming a first semicylindrical member; and
  a second bearing half-shell forming a second semicylindrical member, the second bearing half-shell assembled to the first bearing half-shell to form a cylindrical member, the cylindrical member including:
    an outer surface;
    an inner surface; and
    at least one end
  a first cut-out groove coupled to the at least one end of the cylindrical member, the first cut-out groove disposed from the outer surface and to the inner surface of the cylindrical member, a second cut-out groove coupled to the at least one side cheek, the second cut-out groove disposed on the at least one side cheek and facing the at least one end of the cylindrical member, and at least one annular protrusion extending radially from the outer circumference of the second end portion, the at least one annular protrusion including a third cut-out groove disposed on the at least one annular protrusion and facing the at least one end of the cylindrical member.

13. The engine assembly of claim 12, wherein the at least one end of the cylindrical member is in communication with one of:
  the at least one side cheek; and
  the at least one annular protrusion.

14. The engine assembly of claim 13, further including at least one channel associated with the crankshaft, wherein a first opening of the channel is positioned lateral to the at least one end of the cylindrical member, and a second opening of the channel is positioned on the crankshaft.

15. A bearing mechanism configured to mount a connecting rod to a crankshaft, the bearing mechanism comprising:
  a first bearing half shell forming a first semicylindrical member; and
  a second bearing half-shell forming a second semicylindrical member, the second bearing half-shell fastened to the first bearing half-shell to form a cylindrical member, the cylindrical member including:
    an outer surface;
    an inner surface;
    at least one end; and
    at least one aperture through the outer surface and the inner surface of the cylindrical member, the at least one aperture including a first width associated with the outer surface and a second width associated with the inner surface, and wherein the first width and the second width are unequal in size.

16. A bearing mechanism configured to mount a connecting rod to a crankshaft, the bearing mechanism comprising:
  a first bearing half shell forming a first semicylindrical member; and
  a second bearing half-shell forming a second semicylindrical member, the second bearing half-shell fastened to the first bearing half-shell to form a cylindrical member, the cylindrical member including:
    an outer surface;
    an inner surface;
    at least one end; and
    at least one hydrodynamic ramp coupled to at least one of the outer surface of the cylindrical member and the inner surface of the cylindrical member.

17. The bearing mechanism of claim 16, further including an overlay material assembled on the outer surface and the inner surface of the cylindrical member, the overlay material configured to be softer than the cylindrical member and the connecting rod.

18. The bearing mechanism of claim 17, wherein the at least one end of the cylindrical member includes a first cut-out groove disposed from the outer surface to the inner surface of the cylindrical member.

19. The bearing mechanism of claim 17, wherein the outer surface of the cylindrical member is substantially tapered at the at least one end.

20. The bearing mechanism of claim 17, wherein a first hydrodynamic ramp is coupled to the outer surface of the cylindrical member and a second hydrodynamic ramp is coupled to the inner surface of the cylindrical member.

* * * * *

UNITED STATES PATENT AND TRADEMARK OFFICE
CERTIFICATE OF CORRECTION

PATENT NO. : 7,703,432 B2
APPLICATION NO. : 11/984394
DATED : April 27, 2010
INVENTOR(S) : Shaffer It is certified that error appears in the above-identified patent and that said Letters Patent is hereby corrected as shown below:

Please correct the References Cited as follows:
Page 2, item (56), under "Other Publications", in Column 2, Line 2, delete "2007 ]." and insert -- 2007]. --.

Please correct the Specification as follows:
Column 3, line 25, delete "1" and insert -- 11 --.

Please correct the Claim as follows:
Column 10, line 38, in Claim 20, delete "claim 17," and insert -- claim 16, --.

Signed and Sealed this

Seventeenth Day of August, 2010

David J. Kappos
*Director of the United States Patent and Trademark Office*